United States Patent Office 3,675,979
Patented July 11, 1972

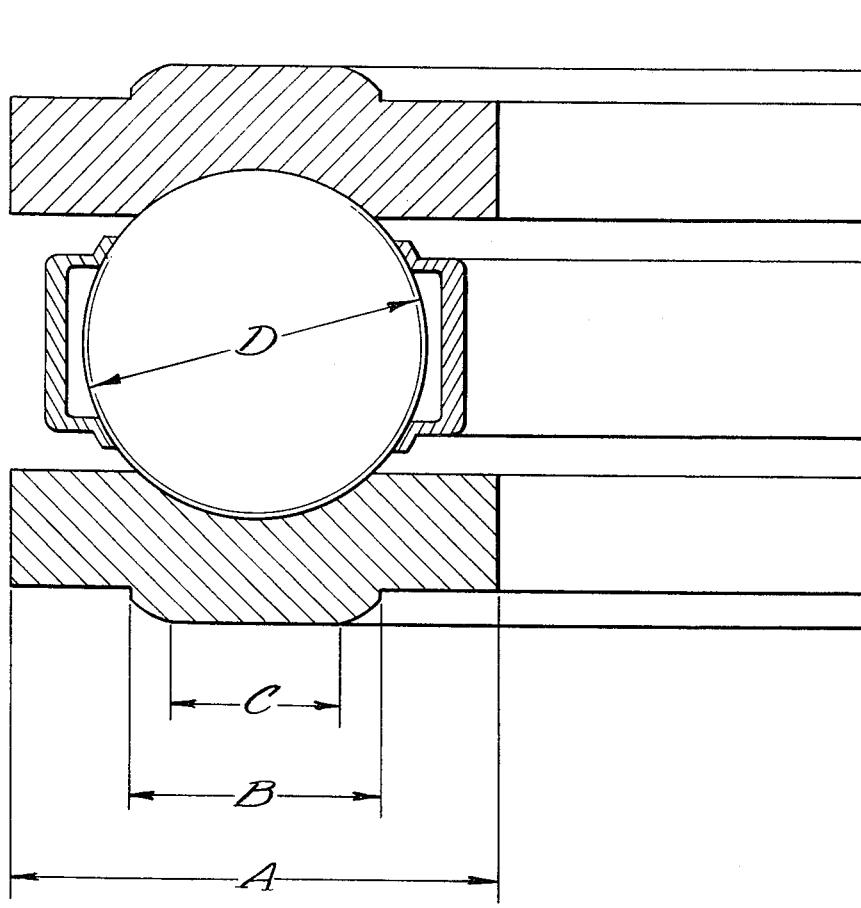

1

3,675,979
ROLLING BEARINGS COMPRISING ANNULAR WASHERS OR CYLINDRICAL SLEEVES PROVIDED WITH A NUMBER OF BALL GROOVES
Stig Lennart Hallerback, Vastra Frolunda, Sweden, assignor to SKF Industrial Trading and Development Company N.V., Amsterdam, Netherlands
Filed Dec. 3, 1970, Ser. No. 94,804
Claims priority, application Sweden, Dec. 12, 1969, 17,166/69
Int. Cl. F16c 17/00
U.S. Cl. 308—230                                     1 Claim

ABSTRACT OF THE DISCLOSURE

Rolling bearings comprising annular washers or cylindrical sleeves provided with a number of ball grooves, which washers or sleeves are made of a sheet metal material and with a mainly constant thickness in a section through the center of the axis, characterized thereby that the washer or sleeve has two characteristic zones on the surface opposite the ball groove, both zones being considerably narrower than the total width of the section.

---

In the manufacturing of rings, for example for radial ball bearings and washers for thrust ball bearings, generally rings or washers with rectangular cross sections are used initially, in which rings or washers ball grooves are being formed by working off some material. The thrust bearing washers are often manufactured by forging or drop forging, whereby the above mentioned rectangular cross section with the ball groove is obtained.

Since the greatest stresses in a ball bearing ring or washer occur at the bottom of the groove, it is essential that the thickness of the material in the groove zone is sufficient. At the sides of the groove zone the thickness of the material usually is greater—as is obvious from the above mentioned—which undoubtedly is a waste of material.

According to the present invention the thickness is made generally constant over the whole width of the section which implies several advantages. Primarily less material than usual is needed, in other words the material costs and the weight of the bearing decreases. Moreover, it becomes possible to start from a sheet metal material which is already manufactured serially in suitable dimensions and qualities (e.g. stainless).

Even for rings for radial bearings metal sheets which have been formed to tubes and welded can be favorably used.

2

The ball grooves are obtained best and cheapest by rolling, pressing or embossing whereby the holding-up tool is provided with a groove with the width B, see figure. The width B is suitably made less than the diameter D of the ball. The depth of the groove is adapted so that the sheet metal material is contacting the bottom of the groove along the zone C during the rolling, pressing or embossing operation.

By means of this manufacturing method the grooves will obtain an accuracy of form and a surface finish sufficient for the functioning of the bearing. Grinding and polishing of the grooves is thus not needed which further reduces the costs of the suggested bearings.

The section of a washer or ring manufactured according to the present invention will have the shape shown in the figure. The measures A, B, C and D are in certain relationship to each other. C represents the zone that distributes the load from either the axle or the bearing housing to the raceway and the balls. This load carrying zone C is considerably narrower than the width A of the whole section, partly for manufacturing and cost reasons and partly for functioning conditions, because a suitably concentrated load just opposite the ball grooves does not result in a deformation of the relatively thin washer or ring.

I claim:
1. A ball bearing assembly comprising a pair of annular members having confronting surfaces each formed with a single circumferentially extending arcuate raceway, a plurality of balls engageable with the raceways, each of said annular members formed with a radial projection opposite the raceway, the projection terminating in rounded outer edge portions defining a central zone of an axial width less than an outer zone defined by the entire projection, said outer zone being of an axial width less than the diameter of the balls and substantially less than the total axial width of the annular members, said annular members being made by a single forming operation not requiring metal working of the raceways.

References Cited

UNITED STATES PATENTS

| 1,399,190 | 12/1921 | Campbell | 308—230 |
| 2,146,663 | 2/1939 | Vaughn | 308—195 |

FOREIGN PATENTS

| 1,203,052 | 10/1965 | Germany | 308—212 |

MARTIN P. SCHWADRON, Primary Examiner
F. SUSKO, Assistant Examiner